United States Patent Office 3,277,974
Patented Oct. 11, 1966

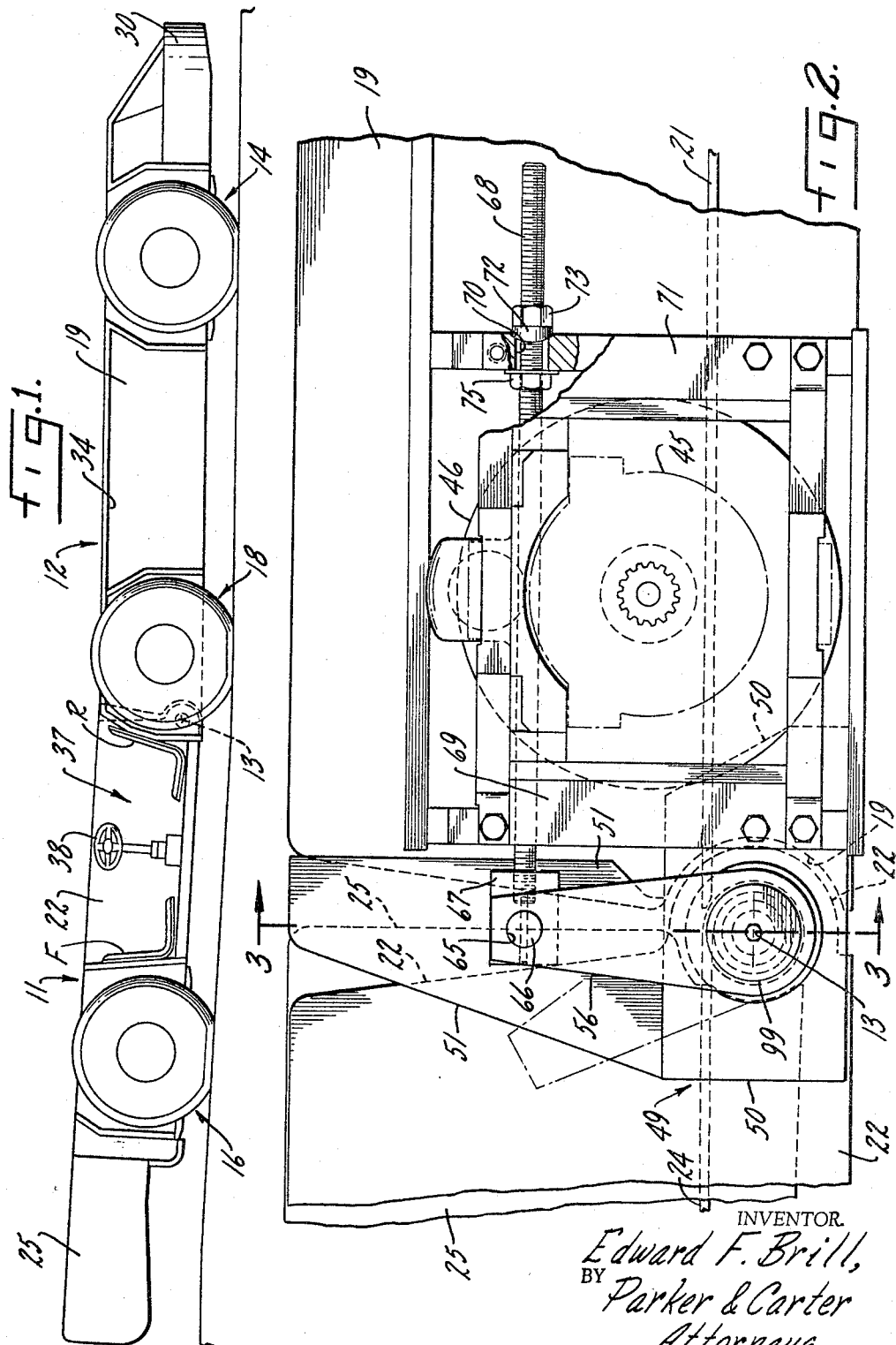

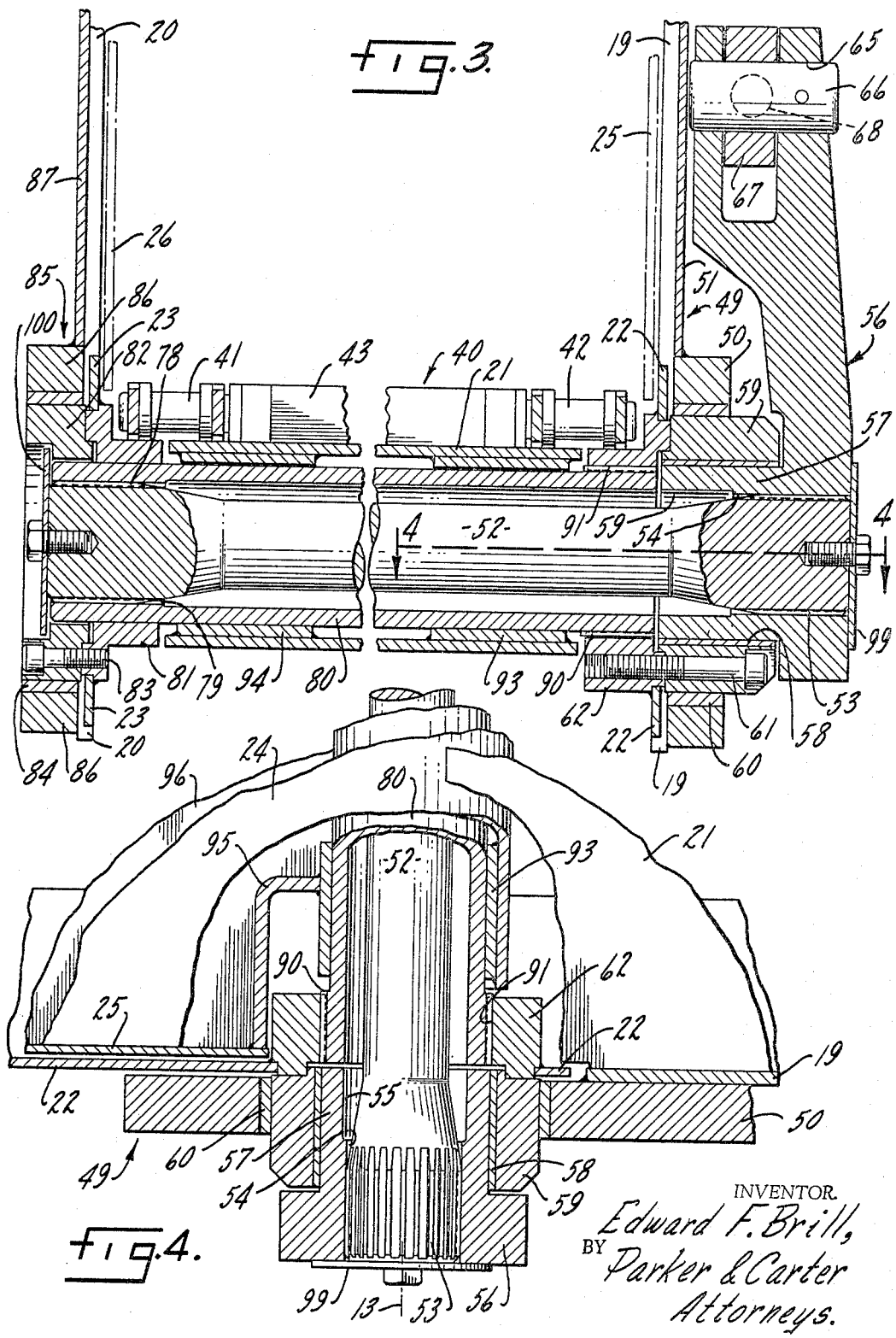

3,277,974
MEANS FOR INCREASING THE WHEEL TRACTION AND BRAKING EFFORT
Edward F. Brill, Oconomowoc, Wis., assignor to Westinghouse Air Brake Company, Pittsburgh, Pa., a corporation of Pennsylvania
Filed Oct. 18, 1965, Ser. No. 496,897
8 Claims. (Cl. 180—22)

This invention relates to underground haulage vehicles and particularly to means for increasing the effective braking effort of such a vehicle, especially in an unloaded or a lightly loaded condition. The invention described herein is an improvement on the invention disclosed in co-pending application Ser. No. 324,732, filed Nov. 19, 1963, and assigned to the same assignee as is the present application, to which reference is made for further understanding and amplification of the environment of the invention.

The 6-wheel shuttle car disclosed in this and the aforementioned application presents a design which has an excellent live load to dead weight ratio. The weight of the load in some instances may equal or even exceed the weight of the shuttle car itself. This design provides an articulated vehicle, having a receiving body section and a discharge body section hinge connected together to form a continuous U-shaped material carrying trough. Three pairs of wheels support the vehicle including a set of steerable traction wheel assemblies at each end of the vehicle and a pair of non-steerable, traction wheel assemblies adjacent the center hinge connection. These non-steerable traction wheels are provided with the braking means which must be of a braking capacity to accommodate the entire car.

Typical designs of shuttle cars, including the car described above, provide some overhang of the frame beyond the wheels, and this overhang and the added weight of the discharge elevating conveyor boom all tend to distribute the weight unfavorably for ideal traction of the center wheels, particularly when the car is unloaded.

The primary object of this invention is to provide added loading to the center wheels to insure adequate traction for safe braking of the car, especially when traveling down a grade and without a load.

To this end a torsion loading means is provided concentric with the center articulating axis of the hinged body shuttle car. This torsion means provides for load transfer to the center brake wheels from the steerable end wheels.

The torsion means comprises a torque tube which is keyed to the discharge end portion of the shuttle car body at one side and extends laterally, concentric with the hinge axis, to the opposite side of the car. Internal keying means secures a torque shaft to the torque tube. The torque shaft extends back inside the torque tube to the first side and somewhat beyond, terminating with a splined portion which has affixed thereto an upright lever arm.

A threaded rod is pivotally connected to the free end of the lever arm and extends in back of the center wheel and brake unit to a mounting bracket affixed to the receiving end portion of the shuttle car. A nut is turned on the rod to take up on the lever arm, thereby applying a desired torsional load to the torque shaft, through to the far side and back by way of the torque tube to the first side where it is secured to the discharge end portion of the shuttle car body. Thus, both working ends of the torsion means are located on the same side of the car. One end is secured to the discharge end portion and the other end is secured to the receiving end portion through the adjustable take-up means including the lever arm and the threaded rod and nut.

A torque means is thus provided, which has an effective length generally equal to twice the width of the shuttle car body and capable of a high degree of torsional loading.

It is recognized that the torsion means will be to a minor extent affected by the flexing of the receiving and discharge end portions of the shuttle car body in negotiating a rolling mine floor.

The torque tube also serves as the supporting pivot shaft for the conveyor discharge boom.

Other objects and advantages of the invention will become apparent upon a reading of the following description of the invention.

The invention is illustrated more or less diagrammatically in the accompanying drawings.

FIGURE 1 is a side elevation of a shuttle car which is representative of the type of haulage vehicle to which the present invention may be applied;

FIGURE 2 is a detail, partial elevational view to an enlarged scale of one side of the haulage vehicle of FIGURE 1 showing particularly the interconnection between adjacent body sections;

FIGURE 3 is a sectional view with parts shown in phantom for clarity taken substantially along the line 3—3 of FIGURE 2; and FIGURE 4 is a view taken substantially along the line 4—4 of FIGURE 3 with parts broken away for clarity and others omitted.

Like reference numerals will be used to refer to like parts throughout the following description of the figures.

The shuttle car is shown in complete outline in FIGURE 1. It consists essentially of a pair of body sections 11 and 12 which are articulately connected to one another for flexing movement in a generally vertical plane about a common pivot 13. A pair of steerable wheel assemblies, one of which is indicated at 14, are located at the forward or front end of the body, in this instance body section 12. A second pair of steerable wheel assemblies, one of which is indicated at 16, is located at the rear of the body. A third pair of wheel assemblies, one of which is indicated at 18, is located at the approximate mid point of the body, the mid set of wheels being non-steerable.

The right end of the car as viewed in FIGURE 1 is arbitrarily referred to as the forward end because it is the end which moves toward the working face. The coal or other mined material is deposited into the car at the right end and moved to the left for discharge by conveyor means described hereafter. In use, the car is seldom, if ever, turned around to retrace its path of travel; rather, the direction of rotation of the wheels is reversed.

It should be understood that although it is contemplated that a pair of wheel assemblies shall comprise each set of wheel assemblies, the term "set" is not so limited. It is entirely possible that each wheel assembly may include two or even more tires. The provision of additional wheels might be particularly desirable when the car is intended for operation on soft bottoms. Furthermore, although the center set of wheel assemblies 18 have been shown as located off center from the pivot means 13 it is entirely possible that this set of wheel assemblies could be located at any desired position intermediate the end sets of wheels. The center set might, for example, under certain conditions, be located in axial alignment with the common pivot axis 13. It is contemplated however that it will be most advantageous to offset the center set of wheels from the pivot means since this generally results in a considerably simpler structure and better space utilization.

Forward body section 12 includes a pair of generally vertical, parallel sidewalls 19 and 20 which are welded or otherwise suitably secured to a bottom plate 21. Rear or discharge body section 11 includes a pair of outer sidewalls, indicated at 22 and 23 in FIGURES 1 and 3, and a pair of inner load contacting sidewalls indicated at 25 and 26 in FIGURES 1 and 3, the latter being welded or otherwise suitably secured to a bottom plate 24. The load contacting walls and bottom plates of body sections 11 and 12 form generally U-shaped material carrying chambers, the chambers together forming an elongated, articulated, generally U-shaped carrying trough.

It will be noted from FIGURES 2, 3 and 4 that sidewalls 19 and 22 are co-planar with one another. Further the downstream end of body section 12 is supported by the center set of wheel assemblies 18. The center wheel assembly 18 has been omitted from FIGURE 2 for purposes of clarity.

A bumper structure 30 extends about the forward end of the car. A plurality of horizontally oriented side plates, one of which is indicated at 34 extend outwardly from the sidewalls to shield operating components which are located along the sides of the car. An operator's compartment is indicated at 37, the compartment including a steering wheel 38 and a pair of seats F and R, one facing forwardly and the other rearwardly. An endless slat conveyor, indicated generally at 40 in FIGURE 3 traverses the length of the carrying trough. The conveyor consists essentially of a pair of link chains 41, 42 which move slats 43 over the bottom of the carrying trough.

The motor drive is indicated in phantom at 45 and the disc brake outline at 46.

In this application the terms "upstream" and "downstream" are used in the context of the normal direction of flow of material through the body, which is from right to left as viewed in FIGURE 1.

The pivot means for articulately connecting the body sections to one another will next be described.

A connecting block is indicated generally at 49. The components of the connecting block, 49 and several other members in the figures, have been identified more than once by the reference numerals to give an indication of their contour. Lower portion 50 of connecting block 49 and upwardly extending flange portion 51 form, in effect, the main support structure or pillow block for the flexing mechanism associated with movement of body section 11. The flexing mechanism will now be described.

A torsion shaft is indicated at 52. The shaft is externally splined as at 53 to an internal spline 54 formed within the lower bore 55 of a torsion arm member 56. The outer surface of the inwardly projecting portion 57 of torsion arm member 56 receives a sleeve bushing 58. The sleeve bushing 58 in turn fits within a collar 59. Another sleeve bushing 60 is located between collar 59 and the lower section 50 of connecting block 49. Collar 59 is fixed with respect to the outer sidewall 22 of body section 11 by virtue of a plurality of fasteners 61 which connect collar 59 to a ring 62 located on the inner side of wall 22 and welded thereto. Collar 59 and block 62 are interfitting as best seen in FIGURES 3 and 4.

Torsion arm member 56 is thereby able to rotate with respect to collar 59 and round block 62 when the body sections are in a position to rest. Furthermore, the torsion arm member 56 is also movable with respect to round block 62 when body section 11, and thereby block 62, is also moving with respect to body section 12.

The upper end of torsion arm member 56 is formed as a clevis having an aperture 65 therein. A pin 66 is received in aperture 65, the pin passing through an aperture of similar size in a block 67. One end of a loading rod 68 is threadably received in a suitably threaded aperture in block 67. The rod passes behind an L-shaped channel member 69 which forms part of the frame in which the drive motor and disc brake mechanisms are mounted. The rod passes through an oversized aperture 70 in an oppositely disposed channel member 71. A spherical washer 72 and tightening nut 73 are located on the tension side of channel 71, the spherical washer 72 seating in a spherical depression formed in channel 71. A lock nut assembly is indicated at 75.

The left end of torsion shaft 52, as viewed in FIGURE 3, terminates in an external spline 78 which mates with an internal spline 79 formed at the inner end of the torsion tube 80. Torsion tube 80 is journaled at its left end in a journal member 81 which is fixed to outer sidewall 23 as by welding. A support collar is indicated at 82, the collar being fastened to journal member 81 by bolts 83. A sleeve bushing is indicated at 84.

A connecting block assembly 85 consisting of a lower thick portion 86 and an upwardly extending flange portion 87 which is indentical in all respects and contour to connecting block 49 carries the sleeve bushing 84. It will thus be seen that the torsion tube 80 may rotate with respect to collar 82, and the torsion tube journal 81. The sides 22–23, and thereby body section 11, are thus able to rotate with respect to body section 12.

The right end of torsion tube 80 terminates in an external spline 90 which engages an internal spline 91 formed within block 62.

From FIGURE 4 it will be noted that the torsion tube 80 supports, at its ends, a pair of sleeves 93 and 94, said sleeves in turn carrying spacers, one of which is indicated at 95 in FIGURE 4. Spacer 95 is welded to the wall 25. A stiffener plate is indicated at 96, the right end of said plate as viewed in FIGURE 4 being welded to the right end of bottom plate 24 and the left end of the stiffener plate being welded to the lower surface of bottom plate 24 at a location a short distance to the left of pivot 13 as viewed in FIGURE 1.

End plates are indicated at 99 and 100. The end plates form abutments which limit the longitudinal float of torsion shaft 52 and torsion tube 80.

The use and operation of the invention is as follows.

The ability to quickly stop a comparatively fast moving shuttle car is essential to the safety of mine personnel. In the six wheel shuttle car of this and the aforesaid copending application it is dependent on the braking effort obtainable through the center or braking wheels. Therefore a means must be employed to provide adequate traction at the center wheels with a full time effectiveness, one that is not subject to electrical or hydraulic failures or lack of responsiveness. The torque loading means of this invention possesses these qualities. It does so by providing additional load on the center wheels to obtain the traction needed for safe braking even when the car travels without a load.

In order to impose a greater load on the middle wheel assemblies 18 to thereby increase the braking effort, and assuming that torsion arm member 56 occupies the dotted line position of FIGURE 2, the following occurs.

Lock nut assembly 75 is loosened and moved to the left as viewed in FIGURE 2. The tightening or tension applying nut 73 is then drawn up moving threaded tension rod 68 to the right. This movement moves torsion arm 56 from the dotted to the solid line position in FIGURE 2 by means of the pin 66 which connects block 67 to the clevis formed in the upper end of torsion arm 56.

Connecting block assembly 49 is fast with the sidewall 19 of body section 12. Movement of the torsion arm 56 in a clockwise direction is permitted however because the lower barrel portion 57 is rotatably received within sleeve 58.

Rotation of torsion arm member 56 clockwise imposes a torque load on the right end of torsion shaft 52, the load acting in a clockwise direction as viewed in FIGURES 2 and 4, by virtue of the interengaging splines 53 and 54.

Clockwise rotation of torsion shaft 52 likewise occurs at the left end of the shaft and this rotation is transmitted to torsion tube 80 by virtue of the engaging splines 78–79.

Since the left end of the torsion tube 80 is rotatably supported in journal 81, movement of the torsion tube may occur relative to the journal and sidewall 23 to which the journal is fast.

The clockwise rotation of torsion tube 80 is transmitted to exterior spline 90 and a torque load is thereby imposed on block 62 in a clockwise direction.

Block 62 is fast with collar 59 and sidewall 22 of body section 11. Relative movement between collar 59, block 62 and sidewall 22, and connecting block assembly 49 occurs however because collar 59 is rotatably received within the sleeve bearing 60 in the connecting block assembly 49. As a result the right end of left body section 11 is moved clockwise as viewed in FIGURE 1 thereby imposing load on wheel assembly 18.

As an example of the increase in weight distribution which may be accomplished by employment of the above described invention, the following example is given.

The weight distribution on each of the three sets of wheels of the car of FIGURE 1 was measured in an unloaded condition, and at a time when no substantial torsion had been applied to torsion shaft 52 by torsion arm 56. The following weights were recorded:

|  | Pounds |
|---|---|
| The wheels at the receiving end (14) | 6,500 |
| The braking wheels at the center (18) | 3,600 |
| The wheels at the discharge boom end (16) | 10,400 |
| Approximate total weight of car | 20,500 |

After the foregoing measurements were taken torsion arm 56 was moved clockwise and the readings again taken. The following results were noted:

| The wheels at the receiving end | 4,150 |
|---|---|
| The braking wheels at the center | 8,350 |
| The wheels at the discharge boom end | 7,950 |
| Approximate total weight of the car | 20,450 |

Further it will be noted that the load on the center wheels was more than doubled, thereby increasing the braking effort by over 200%.

Although a preferred embodiment of the invention has been illustrated and described it will at once be apparent to those skilled in the art that other modifications may be made within the scope of the invention. Accordingly it is intended that the invention be limited not by the foregoing description but solely by the scope of the hereafter appended claims.

I claim:
1. Means for increasing the braking effort of a transversely pivotally interconnected multi-section vehicle, said means including
    torsion spring means associated with a pair of adjacent, interconnected vehicle sections,
    first means operably connecting one end portion of said torsion spring means to one of said pair of vehicle sections,
    second means operably connecting the other end portion of said torsion spring means to the other of said vehicle sections,
    braking wheel means associated with the interconnected vehicle sections at their region of interconnection, and
    means included in one of the aforementioned first and second connecting means to load said torsion spring means to thereby impart a generally downwardly directed force on the braking wheel means.
2. The apparatus of claim 1 further characterized in that said torsion spring means includes a torsion shaft which extends laterally with respect to the longitudinal axis of the vehicle.
3. The apparatus of claim 1 further characterized, firstly, in that the torsion spring means comprises two members which are interconnected one to the other intermediate their extreme end portions, and secondly, in that each extreme end portion acts on its associated section of the vehicle at the same side thereof.
4. The apparatus of claim 3 further characterized in that
    said torsion spring means extends laterally to the opposite side of the vehicle from which the aforesaid extreme end portions are located to thereby provide a torsion spring means having an effective length of approximately twice the lateral width of the vehicle.
5. The apparatus of claim 1 further characterized in that said torsion spring means includes
    a torsion shaft and
    a torsion tube,
    one end portion of said shaft being carried by one of said vehicle sections,
    one end portion of said tube being carried by the other of said vehicle sections,
    the other end portions of said shaft and tube being connected one to the other.
6. The apparatus of claim 5 further characterized in that
    said torsion shaft is located concentrically within said torsion tube.
7. An articulated mine haulage vehicle comprising:
    a pair of interconnected body sections,
    a hinge means connecting said pair of body sections together,
    wheel means supporting said vehicle including
        a pair of steerable wheels associated with each of said body sections, at least one pair of said steerable wheels having traction means provided therefor,
        a third pair of non-steerable wheels associated with the hinge means intermediate said pair of steerable wheels,
        brake and traction means associated with the said third pair of non-steerable wheels,
    a torsion spring means extending laterally of the vehicle and concentric with the hinge axis, first means operably connecting one working end of said torsion spring means to one of said body sections,
    second means operably connecting the other working end of said torsion spring means to the other of said body portions,
    means included in one of the aforesaid first and second connecting means to load said torsion spring means to impart a downward force on the said third pair of non-steerable braking wheels.
8. The articulated mine haulage vehicle of claim 7 further characterized in that the means to load the torsion spring means comprises structure having
    a first end portion connected to a working end of the torsion spring means, and
    a second end portion connected to said first end portion and to an associated body section by means which prevents further loading or unloading of the torsion spring means after establishment of a desired degree of load by application of a loading force thereto whereby subsequent downward force variations on the non-steerable braking wheels is derived solely from relative displacement of the body sections with respect to one another.

References Cited by the Examiner

UNITED STATES PATENTS

| 2,962,176 | 11/1960 | Russell. | |
|---|---|---|---|
| 3,053,335 | 9/1962 | Gnade et al. | 180—22 |
| 3,154,163 | 10/1964 | Hagenbook | 180—22 |

FOREIGN PATENTS 1,111,956 7/1961 Germany.

A. HARRY LEVY, *Primary Examiner.*